Jan. 6, 1970  KOW-FAT LAI  3,488,108

GAUSS DOUBLE TYPE OBJECT-LENS

Filed Jan. 4, 1967

INVENTOR

Kow-Fat Lai

BY

*Emary L. Groff Jr.*

ATTORNEY

United States Patent Office 3,488,108
Patented Jan. 6, 1970

3,488,108
GAUSS DOUBLE TYPE OBJECT-LENS
Kow-Fat Lai, Yverdon, Vaud, Switzerland, assignor to Paillard, S.A., Vaud, Switzerland, a corporation of Switzerland
Filed Jan. 4, 1967, Ser. No. 607,322
Claims priority, application Switzerland, Jan. 31, 1966, 1,325/66
Int. Cl. G02b 9/62, 9/64
U.S. Cl. 350—215                     2 Claims

ABSTRACT OF THE DISCLOSURE

Gauss double type object-lenses comprising, in order from the front, (1) two simple converging meniscus lenses, the convexity of each being to the front, (2) two diverging meniscus doublet-lenses, the concavities of each facing each other, and (3) a converging system consisting of two identical converging lenses.

---

The Gauss double type object-lenses comprise, in order from the front, two converging simple meniscus lenses the convexity of which is to the front, two diverging doublet-lenses in the form of menisci the concavities of which face each other, and a converging system.

The invention has for object an object-lens of this type permitting a large opening, of the order of $F:1.0$ and a very satisfactory correction of spherical aberrations, coma, field curvature, astigmatism, distorsion and chromatic aberrations.

The object-lens according to the invention is characterized by the fact that the converging elements have an Abbe number higher than 45 and the diverging elements an Abbe number lower than 45, and by the following relationship limits for the curvature radii:

$$|R_7| \leqslant |R_8| \leqslant 2|R_7|$$
$$|R_8| \leqslant |R_{10}| \leqslant 2|R_8|$$
$$|R_7| \leqslant |R_5| \leqslant 2|R_7|$$

and $$0.8|R_7| \leqslant |d_7| \leqslant |R_8|$$

Figure 1:
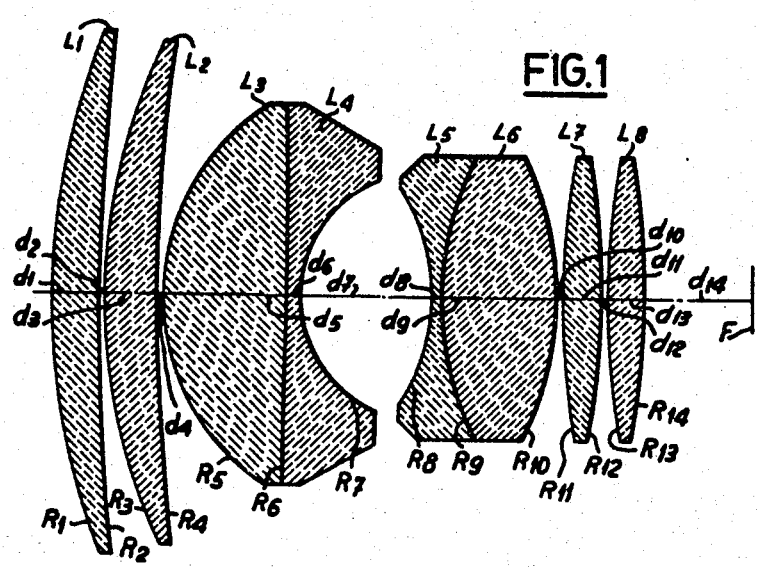

Two embodiments of the object-lens forming the object of the invention are described hereafter by way of examples, with reference to the following drawing, in which:

FIG. 1 is a diagrammatic section of the object-lens.

Figure 2:
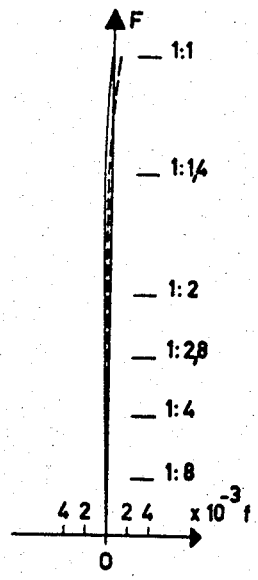
Figure 3:
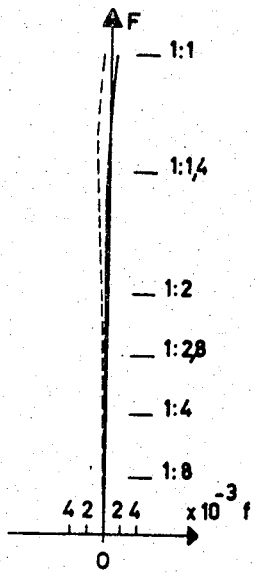

FIGS. 2 and 3 respectively show the spherical aberrations and the sine condition.

This object-lens comprises in order from the front: two converging lenses $L_1$ and $L_2$ in the shape of menisci. These lenses are followed by a first doublet-lens formed by a double-convex lens $L_3$, coupled to a double-concave lens $L_4$, this whole forming a diverging doublet-lens in the shape of a meniscus. This first doublet-lens is followed by a diverging second doublet-lens formed by a double-concave lens $L_5$ coupled to a double-convex lens $L_6$. The second doublet-lens is followed by two similar double-convex lens $L_7$ and $L_8$ identical one to the other. The focal plane is designated by F.

The curvature radii of the different lenses are indicated starting from the front of the object-lens to the back by $R_1, R_2 \ldots R_{14}$.

The thicknesses of the lenses and the air gaps between them are indicated by $d_1, d_2 \ldots d_{14}$.

The two embodiments are defined by the values indicated in the two following examples:

EXAMPLE I
Focal length=1     Relative opening=F:1.0

| Curvature radius | Axial distance | Refractive index | Abbe Number ($\nu$) |
|---|---|---|---|
| $R_1=+1.4859$ |  |  | Air |
|  | $d_1=0.1002$ | 1.6700 | 47.19 |
| $R_2=+5.0270$ |  |  |  |
|  | $d_2=0.0044$ |  | Air |
| $R_3=+1.2175$ |  |  |  |
|  | $d_3=0.1045$ | 1.6700 | 47.19 |
| $R_4=+3.8055$ |  |  |  |
|  | $d_4=0.0044$ |  | Air |
| $R_5=+0.4783$ |  |  |  |
|  | $d_5=0.2570$ | 1.7130 | 53.89 |
| $R_6=-12.489$ |  |  |  |
|  | $d_6=0.0261$ | 1.6989 | 30.05 |
| $R_7=-0.2696$ |  |  |  |
|  | $d_7=0.2788$ |  | Air |
| $R_8=-0.3968$ |  |  |  |
|  | $d_8=0.0261$ | 1.6989 | 30.05 |
| $R_9=+1.6898$ |  |  |  |
|  | $d_9=0.2439$ | 1.7131 | 53.89 |
| $R_{10}=-0.6325$ |  |  |  |
|  | $d_{10}=0.0044$ |  | Air |
| $R_{11}=+1.7111$ |  |  |  |
|  | $d_{11}=0.0784$ | 1.6910 | 54.80 |
| $R_{12}=-1.7111$ |  |  |  |
|  | $d_{12}=0.0044$ |  | Air |
| $R_{13}=+1.7111$ |  |  |  |
|  | $d_{13}=0.0784$ | 1.6910 | 54.80 |
| $R_{14}=-1.7111$ |  |  |  |
|  | $d_{14}=0.3726$ |  | Air |

The aberrations of the object-lens according to Example I are illustrated in FIG. 2, the curve in dash lines representing the sine condition, and the full line curve the spherical aberration in relation to the relative opening.

EXAMPLE II
Focal length=1     Relative opening=F:1.0

| Curvature radius | Axial distance | Refractive index | Abbe Number ($\nu$) |
|---|---|---|---|
| $R_1=+1.5252$ |  |  | Air |
|  | $d_1=0.1023$ | 1.6700 | 47.19 |
| $R_2=+5.1743$ |  |  |  |
|  | $d_2=0.0016$ |  | Air |
| $R_3=+1.2083$ |  |  |  |
|  | $d_3=0.1067$ | 1.6700 | 47.19 |
| $R_4=+3.9145$ |  |  |  |
|  | $d_4=0.0016$ |  | Air |
| $R_5=+0.4876$ |  |  |  |
|  | $d_5=0.2572$ | 1.7170 | 47.90 |
| $R_6=-10.376$ |  |  |  |
|  | $d_6=0.0274$ | 1.6989 | 30.05 |
| $R_7=+0.2736$ |  |  |  |
|  | $d_7=0.2851$ |  | Air |
| $R_8=-0.3800$ |  |  |  |
|  | $d_8=0.0252$ | 1.6989 | 30.05 |
| $R_9=+1.7633$ |  |  |  |
|  | $d_9=0.2594$ | 1.6204 | 60.29 |
| $R_{10}=-0.5199$ |  |  |  |
|  | $d_{10}=0.0016$ |  | Air |
| $R_{11}=+1.4108$ |  |  |  |
|  | $d_{11}=0.0788$ | 1.6910 | 54.80 |
| $R_{12}=-2.2930$ |  |  |  |
|  | $d_{12}=0.0016$ |  | Air |
| $R_{13}=+1.4108$ |  |  |  |
|  | $d_{13}=0.0788$ | 1.6910 | 54.80 |
| $R_{14}=-2.2930$ |  |  |  |
|  | $d_{14}=0.3838$ |  | Air |

The aberrations of the object-lens according to Example II are illustrated in FIG. 3, the curve in dash lines representing the sine condition, and the full line curve the spherical aberration in relation to the relative opening.

In the two preceding examples, the Abbe number of the lenses employed is higher than 45 for the converging lenses and lower than this value for the diverging lenses. In Example I, all the lenses have an index higher than 1.66, but it is not here question of an indispensable measurement, as shown in Example II, in which the lens $L_6$ shows a refraction index lower than this value.

The two lenses $L_7$ and $L_8$ need not necessarily be similar, and these lenses could moreover be replaced by a single converging element having a pronounced curvature.

I claim:

1. A Gauss double type objective lens comprising, in order from the front, (1) two simple converging meniscus lenses, the convexity of each being to the front, (2) two diverging meniscus doublet-lenses, the concavities of each facing each other, and (3) a converging system consisting of two identical converging lenses, said objective lens having the following numerical data:

EXAMPLE I

Focal length=1    Relative opening=F:1.0

| Curvature radius | Axial distance | Refractive index | Abbe Number ($\nu$) |
|---|---|---|---|
| $R_1=+1.4859$ | | | Air |
| | $d_1=0.1002$ | 1.6700 | 47.19 |
| $R_2=+5.0270$ | | | |
| | $d_2=0.0044$ | | Air |
| $R_3=+1.2175$ | | | |
| | $d_3=0.1045$ | 1.6700 | 47.19 |
| $R_4=+3.8055$ | | | |
| | $d_4=0.0044$ | | Air |
| $R_5=+0.4783$ | | | |
| | $d_5=0.2570$ | 1.7130 | 53.89 |
| $R_6=-12.489$ | | | |
| | $d_6=0.0261$ | 1.6989 | 30.05 |
| $R_7=-0.2696$ | | | |
| | $d_7=0.2788$ | | Air |
| $R_8=-0.3968$ | | | |
| | $d_8=0.0261$ | 1.6989 | 30.05 |
| $R_9=+1.6898$ | | | |
| | $d_9=0.2439$ | 1.7131 | 53.89 |
| $R_{10}=-0.6325$ | | | |
| | $d_{10}=0.0044$ | | Air |
| $R_{11}=+1.7111$ | | | |
| | $d_{11}=0.0784$ | 1.6910 | 54.80 |
| $R_{12}=-1.7111$ | | | |
| | $d_{12}=0.0044$ | | Air |
| $R_{13}=+1.7111$ | | | |
| | $d_{13}=0.0784$ | 1.6910 | 54.80 |
| $R_{14}=-1.7111$ | | | |
| | $d_{14}=0.3726$ | | Air | wherein $R_1$–$R_{14}$, inclusive, are the values of the radii of the refracting surfaces, counting from the front to the rear of said objective lens, said values having the sign + when convexity is directed to the front and the sign — when convexity is directed to the rear; $d_1$, $d_3$, $d_5$, $d_6$, $d_8$, $d_9$, $d_{11}$ and $d_{13}$ are the values for the axial thicknesses of the lens elements and $d_2$, $d_4$, $d_7$, $d_{10}$, and $d_{12}$ are the values for axial distances of the air gaps between the component lenses and $d_{14}$ is the value for the axial distance of the air gap between the component lens and the focal plane, counting from the front to the rear of said objective lens, said values for the refractive index and Abbe number being those of the respective lens material of said lenses of said objective lens.

2. A Gauss double type objective lens comprising, in order from the front, (1) two simple converging meniscus lenses, the convexity of each being to the front, (2) two diverging meniscus doublet-lenses, the concavities of each facing each other, and (3) a converging system consisting of two identical converging lenses, said objective lens having the following numerical data:

EXAMPLE II

Focal length=1    Relative opening=F:1.0

| Curvature radius | Axial distance | Refractive index | Abbe Number ($\nu$) |
|---|---|---|---|
| $R_1=+1.5252$ | | | Air |
| | $d_1=0.1023$ | 1.6700 | 47.19 |
| $R_2=+5.1743$ | | | |
| | $d_2=0.0016$ | | Air |
| $R_3=+1.2083$ | | | |
| | $d_3=0.1067$ | 1.67 | 47.19 |
| $R_4=+3.9145$ | | | |
| | $d_4=0.0016$ | | Air |
| $R_5=+0.4876$ | | | |
| | $d_5=0.2572$ | 1.7170 | 47.90 |
| $R_6=-10.376$ | | | |
| | $d_6=0.0274$ | 1.6989 | 30.05 |
| $R_7=+0.2736$ | | | |
| | $d_7=0.2851$ | | Air |
| $R_8=-0.3800$ | | | |
| | $d_8=0.0252$ | 1.6989 | 30.05 |
| $R_9=+1.7633$ | | | |
| | $d_9=0.2594$ | 1.6204 | 60.29 |
| $R_{10}=-0.5199$ | | | |
| | $d_{10}=0.0016$ | | Air |
| $R_{11}=+1.4108$ | | | |
| | $d_{11}=0.0788$ | 1.6910 | 54.80 |
| $R_{12}=-2.2930$ | | | |
| | $d_{12}=0.0016$ | | Air |
| $R_{13}=+1.4108$ | | | |
| | $d_{13}=0.0788$ | 1.6110 | 54.80 |
| $R_{14}=-2.2930$ | | | |
| | $d_{14}=0.3838$ | | Air | wherein $R_1$–$R_{14}$, inclusive, are the values of the radii of the refracting surfaces, counting from the front to the rear of said objective lens, said values having the sign + when convexity is directed to the front and the sign — when convexity is directed to the rear; $d_1$, $d_3$, $d_5$, $d_6$, $d_8$, $d_9$, $d_{11}$ and $d_{13}$ are the values for the axial thickness of the lens elements and $d_2$, $d_4$, $d_7$, $d_{10}$, and $d_{12}$ are the values for axial distances of the air gaps between the component lenses and $d_{14}$ is the value for the axial distance of the air gap between the component lens and the focal plane, counting from the front to the rear of said objective lens, said values for the refractive index and Abbe number being those of the respective lens material of said lenses of said objective lens.

References Cited

UNITED STATES PATENTS 2,012,822   8/1935   Lee _____ 350—218 X
2,701,982   2/1955   Angenieux _____ 350—215

JOHN K. CORBIN, Primary Examiner